United States Patent
Tanimoto et al.

(10) Patent No.: US 8,259,838 B2
(45) Date of Patent: Sep. 4, 2012

(54) SIGNAL TRANSMISSION SYSTEM FOR TRANSMITTING TRANSMISSION SIGNALS VIA A TRANSMISSION LINE INCLUDING TRANSMISSION CONDUCTORS

(75) Inventors: Shin-ichi Tanimoto, Kyoto (JP); Seiji Hamada, Osaka (JP); Hirotsugu Fusayasu, Kyoto (JP); Ryo Matsubara, Osaka (JP)

(73) Assignee: Panasonic Corporation, Osaka (JP)

( * ) Notice: Subject to any disclaimer, the term of this patent is extended or adjusted under 35 U.S.C. 154(b) by 629 days.

(21) Appl. No.: 12/513,009

(22) PCT Filed: Oct. 3, 2007

(86) PCT No.: PCT/JP2007/069371
§ 371 (c)(1),
(2), (4) Date: Jul. 30, 2009

(87) PCT Pub. No.: WO2008/053661
PCT Pub. Date: May 8, 2008

(65) Prior Publication Data
US 2010/0027706 A1 Feb. 4, 2010

(30) Foreign Application Priority Data

Oct. 31, 2006 (JP) .................................. 2006-295743

(51) Int. Cl.
*H04L 27/18* (2006.01)
(52) U.S. Cl. ...................................................... 375/279
(58) Field of Classification Search .................. 375/244, 375/257, 259, 260, 279, 286, 308, 324, 371
See application file for complete search history.

(56) References Cited

U.S. PATENT DOCUMENTS

| 5,166,956 | A | 11/1992 | Baltus et al. |
| 6,075,817 | A * | 6/2000 | Gruenberg ..................... 375/240 |
| 6,243,422 | B1 * | 6/2001 | Urabe et al. .................. 375/259 |

(Continued)

FOREIGN PATENT DOCUMENTS

JP           48-84515          11/1973

(Continued)

OTHER PUBLICATIONS

International Search Report issued Oct. 30, 2007 in the International (PCT) Application No. PCT/JP2007/069371.

(Continued)

*Primary Examiner* — Leon-Viet Nguyen
(74) *Attorney, Agent, or Firm* — Wenderoth, Lind & Ponack, L.L.P.

(57) ABSTRACT

A signal transmitter apparatus generates three phase-shifted signals by shifting three transmission signals by predetermined phase shift amounts so that the phase shift amounts of the transmission signals are different from each other by 120 degrees. The signal transmitter apparatus generates three combined transmission signals and outputs the three combined transmission signals to the three transmission conductors, respectively, by combining each of pairs of the phase-shifted signals such that an inverted signal of a first phase-shifted signal is combined with a second phase-shifted signal, when each of the pairs of the phase-shifted signals includes the first and second phase-shifted signals among the three phase-shifted signals and phase shift amounts of the first and second phase-shifted signals are different from each other by 120 degrees. The signal receiver apparatus generates three receiving signals based on received three combined transmission signals, and detects the decoded signals of the transmission signals based on the receiving signals.

7 Claims, 8 Drawing Sheets

U.S. PATENT DOCUMENTS

| | | |
|---|---|---|
| 6,317,465 B1 | 11/2001 | Akamatsu et al. |
| 6,769,044 B2 | 7/2004 | Matsuzaki |
| 2003/0016056 A1 | 1/2003 | Matsuzaki |
| 2003/0043926 A1 | 3/2003 | Terashima et al. |

FOREIGN PATENT DOCUMENTS

| | | |
|---|---|---|
| JP | 4-230147 | 8/1992 |
| JP | 6-261092 | 9/1994 |
| JP | 11-231984 | 8/1999 |
| JP | 2004-289626 | 10/2004 |
| JP | 2005-210736 | 8/2005 |
| JP | 2005-333508 | 12/2005 |

OTHER PUBLICATIONS

International Preliminary Report on Patentability issued May 14, 2009 in the International (PCT) Application No. PCT/JP2007/069371.

* cited by examiner

Fig.8

| TRANSMISSION DATA | | | SIGNAL VOLTAGE | | | SIGNAL VOLTAGE LEVEL | | |
|---|---|---|---|---|---|---|---|---|
| D1 | D2 | D3 | S31 | S32 | S33 | S41 | S42 | S43 |
| 0 | 0 | 0 | 1 | 1 | * | L | L | L |
| 0 | 0 | 1 | * | * | -2 | L | L | H |
| 0 | 1 | 0 | * | * | * | L | H | L |
| 0 | 1 | 1 | 2 | -2 | -2 | L | H | H |
| 1 | 0 | 0 | * | 2 | 2 | H | L | L |
| 1 | 0 | 1 | -2 | * | * | H | L | H |
| 1 | 1 | 0 | -2 | * | 2 | H | H | L |
| 1 | 1 | 1 | * | -2 | * | H | H | H |

NOTE: SYMBOL * INDICATES THAT SIGNAL VOLTAGE A IS $-0.7 \leq A < 0.7$

SIGNAL TRANSMISSION SYSTEM FOR TRANSMITTING TRANSMISSION SIGNALS VIA A TRANSMISSION LINE INCLUDING TRANSMISSION CONDUCTORS

TECHNICAL FIELD

The present invention relates to a signal transmitter apparatus for transmitting transmission signals, a signal receiver apparatus for receiving the transmission signals, a signal transmitting system having the signal transmitter apparatus and the signal receiver apparatus, and a signal transmitting method and a signal receiving method therefor.

BACKGROUND ART

In recent years, with the improvement in image quality from VGA (Video Graphics Array) to XGA (extended Graphics Array) in flat-panel displays represented by LCD television sets and plasma television sets, signal speed for transferring image information is increasing. Accordingly, as a system for use in high-speed digital data transmissions, a differential transmission system of low amplitude has been used. The transmission system is provided for transmitting signals having phases opposite to each other and amplitudes equal to each other via one balanced cable or two wiring patterns formed on or a printed wiring board. The system has the features of small noise, strong resistance to external noises, small voltage amplitude, high-speed data transmission and so on, and has been introduced as a high-speed transmitting method particularly in the field of displays. However, since the differential transmission system requires two wiring lines for the transmission of one data bit, there has been such a problem that, when a plurality of data bits are transmitted, the number of the wiring lines comparatively increases and the wiring region on the printed wiring board is widened.

According to the signal transmitting system of the prior art described in the Patent Document 1, it is possible to achieve differential transmission of each of two data bits by using three (four by the conventional differential transmission system) transmission conductors including one complementary data line. In addition, it is possible to achieve differential transmission of each of four data bits by using five (eight by the conventional differential transmission system) transmission conductors including one complementary data line. Therefore, it is possible to reduce the number of transmission conductors as compared with the above mentioned conventional differential transmission system.

Patent document 1: Japanese patent laid-open publication No. JP-11-231984-A

Patent document 2: Japanese patent laid-open publication No. JP-2004-289626-A

Patent document 3: Specification of United States Patent Application Publication No. 2003/0043926

DISCLOSURE OF THE INVENTION

Problems to be Solved by the Invention

However, the data transmission system according to the prior art has had such a problem that the number of transmission conductors cannot be further reduced, and the wiring regions on the printed wiring board cannot be further reduced.

An object of the present invention is to provide a signal transmitter apparatus, a signal receiver apparatus, a signal transmitting system having the signal transmitter apparatus and the signal receiver apparatus, and a signal transmitting method and a signal receiving method therefor, each capable of solving the above-mentioned problems and reducing the number of transmission conductors as compared with the prior art.

Means for Solving the Problems

According to the first aspect of the present invention, there is provided a signal transmitter apparatus for transmitting a plurality of N transmission signals generated in synchronization with a first clock signal having a predetermined cycle, via a transmission line including a plurality of N transmission conductors, N being equal to or larger than three. The signal transmitter apparatus have phase shifter means, a plurality of N inverter means, and a plurality of N coding transmitter means. The phase shifter means shifts phases of the transmission signals by predetermined phase shift amounts, respectively, so that the phase shift amounts of the transmission signals are different from each other by $2\pi/N$, to output N phase-shifted signals which are phase-shifted from the N transmission signals. The N inverter means generates inverted signals of the first to Nth phase-shifted signals, and outputting the inverted signals. The N coding transmitter means generates N combined transmission signals and outputting the N combined transmission signals to the transmission conductors, respectively, by combining each of pairs of the phase-shifted signals such that an inverted signal of a first phase-shifted signal is combined with a second phase-shifted signal, when each of the pairs of the phase-shifted signals includes the first and second phase-shifted signals among the N phase-shifted signals and phase shift amounts of the first and second phase-shifted signals are different from each other by $2\pi/N$.

According to the second aspect of the present invention, there is provided a signal receiver apparatus for receiving the plurality of N combined transmission signals transmitted by the signal transmitter apparatus, via the transmission line including the plurality of N transmission conductors, respectively. The signal receiver apparatus have receiver means and decoder means. The receiver means generates N receiving signals, by combining each groups of three combined transmission signals such that a first combined transmission signal is combined with an inverted signal of a second combined transmission signal and a third combined transmission signal, when each of the groups of the three combined transmission signals includes the first, second and third combined transmission signals among the N combined transmission signals. The decoder means detects signal levels of the receiving signals at timings that are different from each other and determined based on a second clock signal having a cycle being $1/N$ of the predetermined cycle, detecting decoded signals of the transmission signals based on the detected signal levels of the receiving signals, respectively, and outputs the decoded signals.

In the above mentioned signal receiver apparatus, the decoder means have register means for temporarily storing the decoded signals of the transmission signals. The decoder means compares each of the receiving signals with a first signal level, and compares each of the receiving signals with a second signal level smaller than the first signal level. When each of the receiving signals is equal to or larger than the first signal level, the decoder means outputs a decoded signal having a first signal level. When each of the receiving signals is smaller than the second signal level, the decoder means outputs a decoded signal having a second signal level. When each of the receiving signals is smaller than the first signal level and equal to or larger than the second signal level, the decoder means outputs a decoded signal, which is stored in the register means at a processing timing immediately prior to a current processing timing, and which is decoded from a receiving signal adjacent to a receiving signal to be processed in a predetermined direction.

According to the third aspect of the present invention, there is provided a signal transmitting system having the above-mentioned signal transmitter apparatus, the above-mentioned signal receiver apparatus, and a transmission line including N transmission conductors for connecting the signal transmitter apparatus with the signal receiver apparatus.

According to the fourth aspect of the present invention, there is provided a signal transmitting method of transmitting a plurality of N transmission signals generated in synchronization with a first clock signal having a predetermined cycle, via a transmission line including a plurality of N transmission conductors, N being equal to or larger than three. The signal transmitting method includes a step of shifting phases of the transmission signals by predetermined phase shift amounts, respectively, so that the phase shift amounts of the transmission signals are different from each other by $2\pi/N$, to output N phase-shifted signals which are phase-shifted from the N transmission signals. In addition, the signal transmitting method includes a step of generating inverted signals of the first to Nth phase-shifted signals, and outputting the inverted signals. Further, the signal transmitting method includes a step of generating N combined transmission signals and outputting the N combined transmission signals to the transmission conductors, respectively, by combining each of pairs of the phase-shifted signals such that an inverted signal of a first phase-shifted signal is combined with a second phase-shifted signal, when each of the pairs of the phase-shifted signals includes the first and second phase-shifted signals among the N phase-shifted signals and phase shift amounts of the first and second phase-shifted signals are different from each other by $2\pi/N$.

According to the fifth aspect of the present invention, there is provided a signal receiving method of receiving the plurality of N combined transmission signals transmitted by the signal transmitting method as claimed in claim 5, via the transmission line including the plurality of N transmission conductors, respectively. The signal receiving method includes a step of generating N receiving signals, by combining each groups of three combined transmission signals such that a first combined transmission signal is combined with an inverted signal of a second combined transmission signal and a third combined transmission signal, when each of the groups of the three combined transmission signals includes the first, second and third combined transmission signals among the N combined transmission signals. In addition, the signal receiving method includes a decoding step of detecting signal levels of the receiving signals at timings that are different from each other and determined based on a second clock signal having a cycle being 1/N of the predetermined cycle, detecting decoded signals of the transmission signals based on the detected signal levels of the receiving signals, respectively, and outputting the decoded signals.

In the above-mentioned signal receiving method the decoding step includes a step of temporarily storing the decoded signals of the transmission signals. The decoding step further includes a step of comparing each of the receiving signals with a first signal level, and comparing each of the receiving signals with a second signal level smaller than the first signal level. The decoding step further includes the steps of, outputting a decoded signal having a first signal level when each of the receiving signals is equal to or larger than the first signal level, outputting a decoded signal having a second signal level when each of the receiving signals is smaller than the second signal level, and outputting a decoded signal, which is stored at a processing timing immediately prior to a current processing timing, and which is decoded from a receiving signal adjacent to a receiving signal to be processed in a predetermined direction, when each of the receiving signals is smaller than the first signal level and equal to or larger than the second signal level.

EFFECTS OF THE INVENTION

According to the signal transmitter apparatus or the signal transmitting method of the present invention, a plurality of N transmission signals generated in synchronization with a first clock signal having a predetermined cycle are coded into a plurality of N combined transmission signals, and thereafter, the plurality of N combined transmission signals are transmitted via a transmission line including a plurality of N transmission conductors. In this case, N is equal to or larger than three. In addition, according to the signal receiver apparatus or the signal receiving method of the present invention, the plurality of N combined transmission signals are received via the transmission line including the plurality of N transmission conductors, and decoded signals of the plurality of N transmission signals are detected based on the received combined transmission signals. Further, according to the signal transmitting system of the present invention, the signal transmitting system have the signal transmitter apparatus, the signal receiver apparatus, and the transmission line including the plurality of N transmission conductors for connecting the signal transmitter apparatus with the signal receiver apparatus.

Therefore, according to the signal transmitter apparatus and method, the signal receiver apparatus and method and the signal transmitting system of the present invention, N transmission signals can be transmitted by using N transmission conductors. For example, although the four transmission signals have been transmitted by using five transmission conductors in the data transmission system of the prior art, the four transmission signals can be transmitted by using four transmission conductors according to the present invention. It is possible to reduce the number of the transmission conductors as compared with the data transmission system of the prior art.

BRIEF DESCRIPTION OF THE DRAWINGS

FIG. 8 is one example of a table showing transmission data D1, D2 and D3 transmitted by the transmission signal S1 of FIG. 3A, the transmission signal S2 of FIG. 3B and the transmission signal S3 of FIG. 3C, respectively, signal voltages detected at predetermined timings from the receiving signal S31 of FIG. 6A, the receiving signal S32 of FIG. 6B and the receiving signal S33 of FIG. 6C, respectively, signal voltage level of a decoded signal S41 outputted from an output terminal T31 of the signal receiver apparatus 200 of FIG. 2, signal voltage level of a decoded signal S42 outputted from an output terminal T32 of the signal receiver apparatus 200 of FIG. 2, and signal voltage level of a decoded signal S43 outputted from an output terminal T33 of the signal receiver apparatus 200 of FIG. 2.

DESCRIPTION OF REFERENCE SYMBOLS

Figure 1:
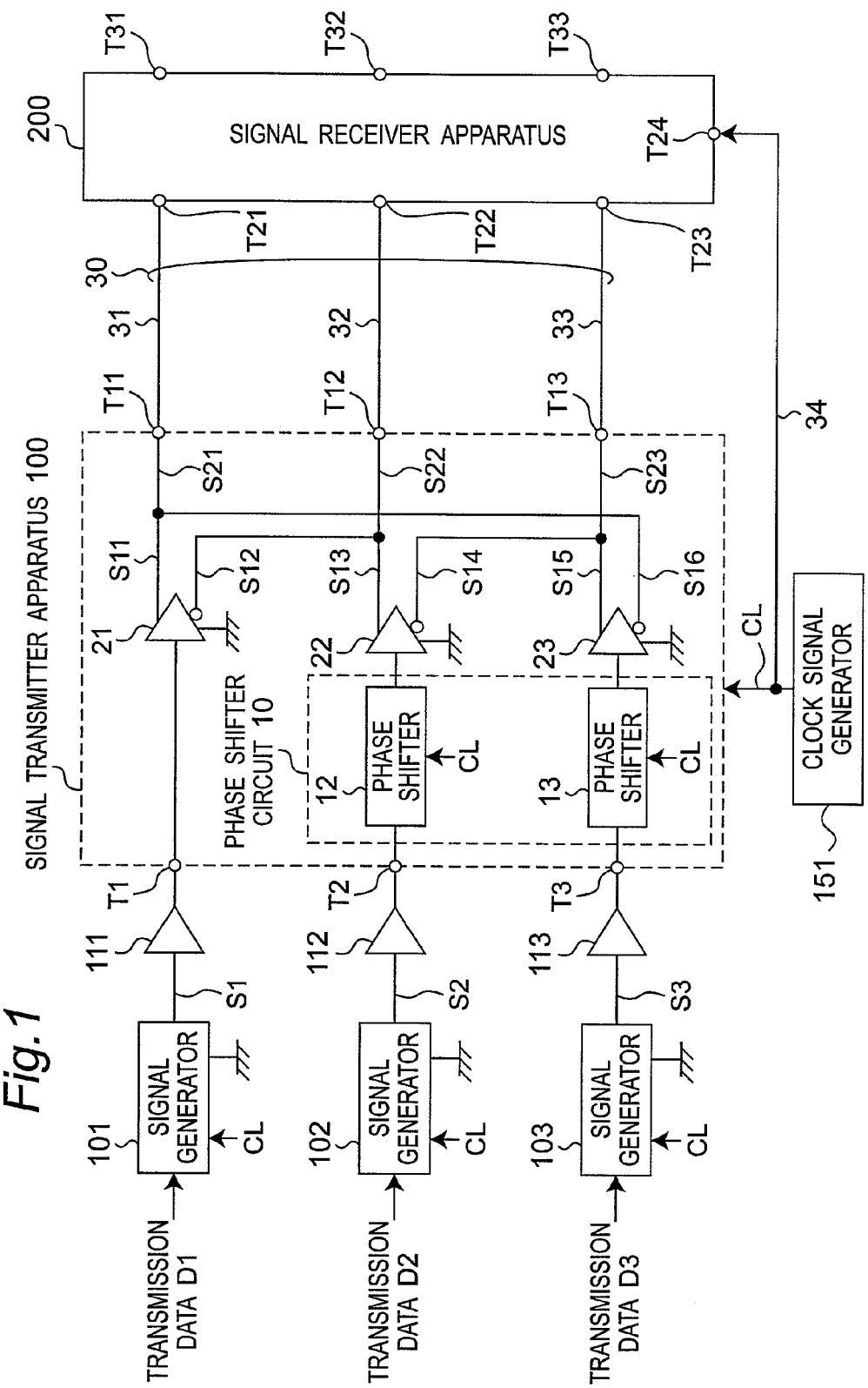
FIG. 1 is a block diagram showing schematic configurations of a signal transmitting system having a signal transmitter apparatus 100 and a signal receiver apparatus 200 according to a preferred embodiment of the present invention.

10 . . . Phase shifter circuit,
12, 13 . . . Phase shifter,
21-23 . . . Differential driver amplifier,
30 . . . Transmission line,
31-33 . . . Transmission conductor,
34 . . . Clock signal line,
41-43 . . . Resistor,
44-46 . . . Differential amplifier,
47-49 . . . Adder,
51-56 . . . Comparator,
57-59 . . . NAND gate,
61-63 . . . AND gate,
64-66 . . . Switch,
67-69 . . . Register,
81 . . . Frequency multiplier,
82 . . . One-shot multi-vibrator,
83, 84 . . . Delay device,
100 . . . Signal transmitter apparatus,
101-103 . . . Signal generator,
111-113 . . . Buffer,
151 . . . Clock signal generator,
200 . . . Signal receiver apparatus,
201 . . . Receiver circuit,
202 . . . Decoder circuit,
51a-56a . . . Reference voltage source,
T1-T3, T21-T24 . . . Input terminal,
T11-T13, T31-T33 . . . Output terminal.

BEST MODE FOR CARRYING OUT THE INVENTION

A preferred embodiment of the present invention will be described hereinafter with reference to the drawings. In the embodiment, components similar to each other are denoted by the same reference numerals.

FIG. 1 is a block diagram showing schematic configurations of a signal transmitting system having a signal transmitter apparatus 100 and a signal receiver apparatus 200 according to a preferred embodiment of the present invention. Referring to FIG. 1, the signal transmitting system of the preferred embodiment of the present invention is constituted by including signal generators 101 to 103, buffers 111 to 113, the signal transmitter apparatus 100, a transmission line 30 including three transmission conductors 31 to 33, the signal receiver apparatus 200, and a clock signal generator 151.

In this case, the signal transmitter apparatus 100 is constituted by including a phase shifter circuit 10 having phase shifters 12 and 13, differential driver amplifiers 21 to 23, input terminals T1 to T3, and output terminals T11 to T13. The phase shifter 12 shifts a phase of an inputted signal by 120 degrees, and outputs a resultant signal as a phase-shifted signal to the differential driver amplifier 22. The phase shifter 13 shifts a phase of an inputted signal by 240 degrees and outputs a resultant signal as a phase-shifted signal to the differential driver amplifier 23. A non-inverted output terminal of the differential driver amplifier 21 is connected to an inverted output terminal of the differential driver amplifier 23, a non-inverted output terminal of the differential driver amplifier 22 is connected to an inverted output terminal of the differential driver amplifier 21, and a non-inverted output terminal of the differential driver amplifier 23 is connected to an inverted output terminal of the differential driver amplifier 22. In this case, each of the differential driver amplifiers 21 to 23 is driven by a power source that outputs an output voltage of 1 V.

The signal receiver apparatus 200 is constituted by including input terminals T21 to T24 and output terminals T31 to T33. The configuration of the signal receiver apparatus 200 is described in detail later with reference to FIG. 2.

Referring to FIG. 1, the clock signal generator 151 generates a clock signal CL having a form of pulses cyclically repeated at a predetermined cycle Δt1, and outputs the clock signal to the signal generators 101 to 103 and the phase shifters 12 and 13. Further, the clock signal CL is inputted to the signal receiver apparatus 200 via a clock signal line 34 and an input terminal T24.

At the timings of respective falling edges of the clock signal CL, the signal generator 101 generates a transmission signal S1 having a signal voltage of, for example, 1 V based on 1-bit transmission data D1 having a data value "0" and a transmission signal S1 having a signal voltage of, for example, −1 V based on 1-bit transmission data D1 having a data value "1", and outputs the transmission signal S1 to the differential driver amplifier 21 via the buffer 111 and the input terminal T1. By this operation, the signal generator 101 generates the transmission signal S1 of a binary bipolar signal based on the 1-bit transmission data D1. Further, a non-inverted signal S11 from the differential driver amplifier 21 is combined with an inverted signal S16 from the differential driver amplifier 23, and a resultant combined transmission signal S21 is inputted to the signal receiver apparatus 200 via the output terminal T11, the transmission conductor 31 and the input terminal T21.

At the timings of the respective falling edges of the clock signal CL, the signal generator 102 generates a transmission signal S2 having a signal voltage of, for example, 1 V based on 1-bit transmission data D2 having a data value "0" and a transmission signal S2 having a signal voltage of, for example, −1 V based on 1-bit transmission data D2 having a data value "1", and outputs the transmission signal S2 to the phase shifter 12 via the buffer 112 and the input terminal T2. By this operation, the signal generator 102 generates the transmission signal S2 of a binary bipolar signal based on the 1-bit transmission data D2. The phase shifter 12 shifts the phase of the inputted transmission signal S2 by 120 degrees, and outputs a resultant signal as a phase-shifted signal of the transmission signal S2 to the differential driver amplifier 22. Further, a non-inverted signal S13 from the differential driver amplifier 22, which is the phase-shifted signal of the transmission signal S2, is combined with the inverted signal S12 from the differential driver amplifier 21, which is the inverted signal of the phase-shifted signal of the transmission signal S1, and a resultant combined transmission signal S22 is inputted to the signal receiver apparatus 200 via the output terminal T12, the transmission conductor 32 and the input terminal T22.

At the timings of the respective falling edges of the clock signal CL, the signal generator 103 generates a transmission signal S3 having a signal voltage of, for example, 1 V based on 1-bit transmission data D3 having a data value "0" and a transmission signal S3 having a signal voltage of, for example, −1 V based on 1-bit transmission data D3 having a data value "1", and outputs the transmission signal S3 to the phase shifter 13 via the buffer 113 and the input terminal T3. By this operation, the signal generator 103 generates the transmission signal S3 of a binary bipolar signal based on the 1-bit transmission data D3. The phase shifter 13 shifts the phase of the inputted transmission signal S3 by 240 degrees, and outputs a resultant signal as a phase-shifted signal of the transmission signal S3 to the differential driver amplifier 23. Further, a non-inverted signal S15 from the differential driver amplifier 23, which is the phase-shifted signal of the transmission signal S3 is combined with an inverted signal S14 from the differential driver amplifier 22, which is the inverted signal of the phase-shifted signal of the transmission, and a resultant combined transmission signal S23 is inputted to the signal receiver apparatus 200 via the output terminal T13, the transmission conductor 33 and the input terminal T23.

Figure 2:
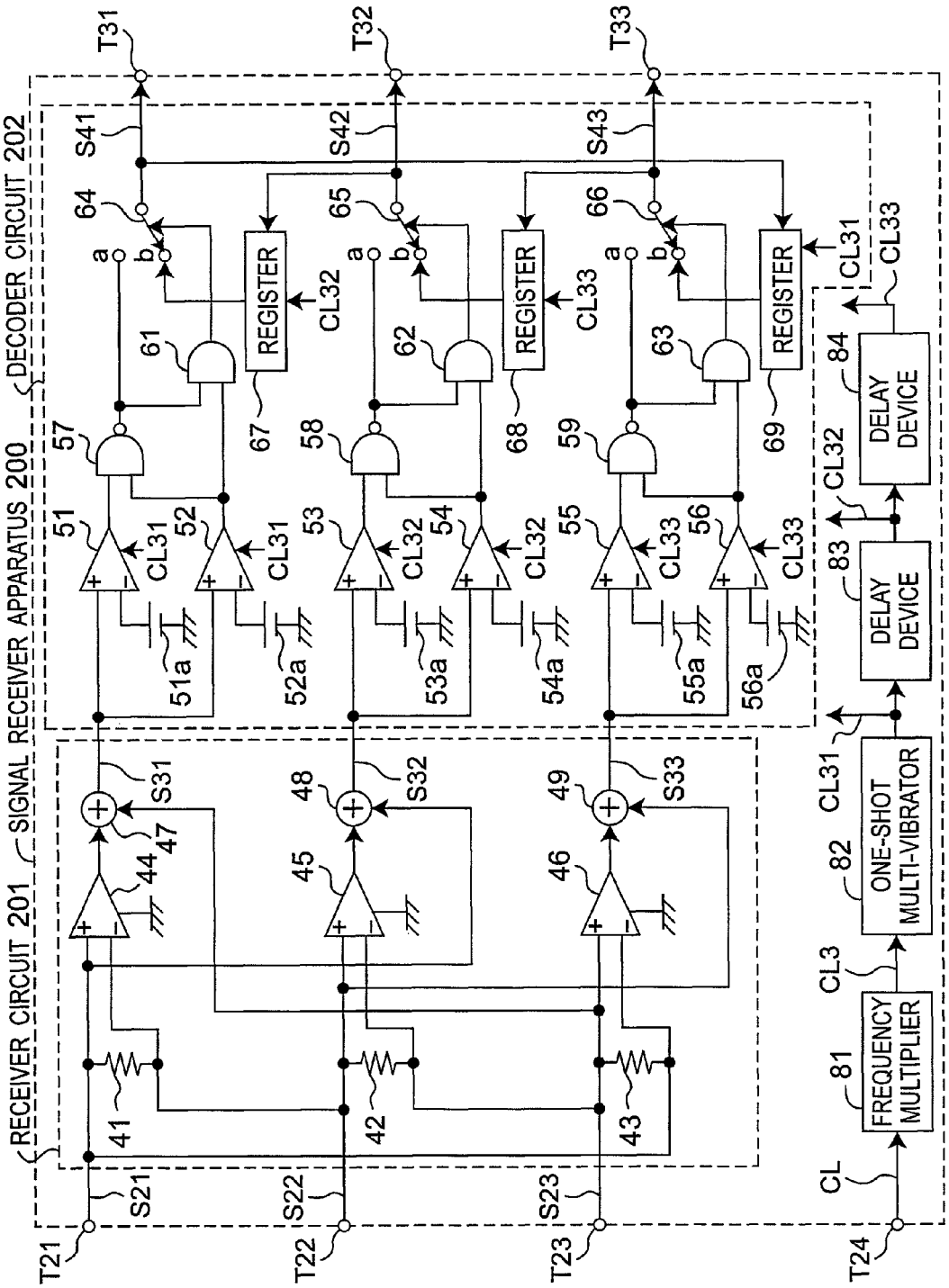
FIG. 2 is a block diagram showing a schematic configuration of the signal receiver apparatus 200 of FIG. 1.

FIG. 2 is a block diagram showing a schematic configuration of the signal receiver apparatus 200 of FIG. 1. Referring to FIG. 2, the signal receiver apparatus 200 is constituted by including a frequency multiplier 81, a one-shot multi-vibrator 82, delay devices 83 and 84, a receiver circuit 201, a decoder circuit 202, the input terminals T21 to T24, and output terminals T31 to T33. In this case, the receiver circuit 201 is constituted by including resistors 41 to 43, differential amplifiers 44 to 46, and adders 47 to 49. The decoder circuit 202 is constituted by including comparators 51 to 56, reference voltage sources 51a to 56a, NAND gates 57 to 59, AND gates 61 to 63, switches 64 to 66, and registers 67 to 69.

In this case, the resistor 41 is connected between the input terminal T21 and the input terminal T22, the resistor 42 is connected between the input terminal T22 and the input terminal T23, and the resistor 43 is connected between the input terminal T23 and the input terminal T21. In addition, the reference voltage sources each 51a, 53a and 55a generate a predetermined reference voltage Vref, and output the reference voltage Vref to inverted input terminals of the comparators 51, 53 and 55, respectively. Further, the reference voltage sources 52a, 54a and 56a each generate a predetermined reference voltage −Vref, and output the reference voltage −Vref to inverted input terminals of the comparators 52, 54 and 56, respectively. In this case, the reference voltage Vref has a voltage value that is larger than 0 V and smaller than, for example, 2 V. Preferably, the reference voltage Vref is 0.7 V.

Referring to FIG. 2, the frequency multiplier 81 generates a clock signal CL3 having a form of pulses cyclically repeated at a predetermined cycle Δt3 (Δt3=Δt1/3) by tripling the frequency 1/Δt1 of the clock signal CL inputted via the input terminal T24, and outputs the clock signal CL3 to the one-shot multi-vibrator 82. At each of the timings of falling edges of the inputted clock signal CL3, the one-shot multi-vibrator 82 generates a pulse signal having a low-level whose pulse length is Δt4 (Δt4=Δt1/2=3×Δt3/2), to generate a clock signal CL31 which has a form of pulses cyclically repeated at the predetermined cycle Δt1 and having high-level time periods and low-level time periods. In this case each of the high-level time periods and low-level time periods has a time period Δt4. The one-shot multi-vibrator 82 outputs the clock signal CL31 to the delay device 83, the comparators 51 and 52, and the register 69. Further, the delay device 83 generates a clock signal CL32 by delaying the inputted clock signal CL31 by a delay time Δt3, and outputs the clock signal CL32 to the delay device 84, the comparators 53 and 54, and the register 67. Further, the delay device 84 generates a clock signal CL33 by delaying the inputted clock signal CL32 by the delay time Δt3, and outputs the clock signal CL32 to the comparators 55 and 56, and the register 68.

Referring to FIG. 2, the combined transmission signal S21 is inputted via the input terminal T21 to a non-inverted input terminal of the differential amplifier 44, the adder 48, and an inverted input terminal of the differential amplifier 46. The signal S22 is inputted via the input terminal T22 to a non-inverted input terminal of the differential amplifier 45, the adder 49, and an inverted input terminal of the differential amplifier 44. Further, the combined transmission signal S23 is inputted via the input terminal T23 to a non-inverted input terminal of the differential amplifier 46, the adder 47, and an inverted input terminal of the differential amplifier 45.

The adder 47 adds an output signal from the differential amplifier 44 to the combined transmission signal S23 from the input terminal T23, and outputs a resultant signal as a receiving signal S31 to a non-inverted input terminal of the comparator 51 and a non-inverted input terminal of the comparator 52. The comparator 51 compares a signal voltage of the receiving signal S31 with the reference voltage Vref at the timings of the falling edges of the clock signal CL31. An output signal having a high-level is generated and outputted to a first input terminal of the NAND gate 57 when the signal voltage of the receiving signal S31 is equal to or larger than the reference voltage Vref. On the other hand, an output signal having the low-level is generated and outputted to the first input terminal of the NAND gate 57 when the signal voltage of the receiving signal S31 is smaller than the reference voltage Vref. The comparator 52 compares the signal voltage of the receiving signal S31 with the reference voltage −Vref at the timings of the falling edges of the clock signal CL31. An output signal having the high-level is generated and outputted to a second input terminal of the NAND gate 57 and a first input terminal of the AND gate 61 when the signal voltage of the receiving signal S31 is equal to or larger than the reference voltage −Vref. On the other hand, an output signal having the low-level is generated and outputted to the second input terminal of the NAND gate 57 and the first input terminal of the AND gate 61 when the signal voltage of the receiving signal S31 is smaller than the reference voltage −Vref.

Further, an output signal from the NAND gate 57 is outputted to a second input terminal of the AND gate 61. In addition, the output signal from the NAND gate 57 is outputted as a decoded signal S41 to the output terminal T31 via a contact "a" of a switch 64, and to the register 69 via the contact "a" of the switch 64 at the timings of the falling edges of the clock signal CL31. The register 69 temporarily stores the inputted decoded signal S41, and outputs the decoded signal S41 to a contact "b" side of the switch 66. In addition, an output signal from the AND gate 61 is outputted to a control terminal of the switch 64. In this case, the switch 64 is switched over to the contact "a" side in response to an output signal having the low-level from the AND gate 61, and switched over to the contact "b" side in response to an output signal having the high-level from the AND gate 61. An output signal from the register 67 is outputted as the decoded signal S41 to the output terminal T31 via the contact "b" of the switch 64, and to the register 69 via the contact "b" of the switch 64 at the timings of the falling edges of the clock signal CL31.

The adder 48 adds an output signal from the differential amplifier 45 to the combined transmission signal S21 from the input terminal T21, and outputs a resultant signal as a receiving signal S32 to a non-inverted input terminal of the comparator 53 and a non-inverted input terminal of the comparator 54. The comparator 53 compares a signal voltage of the receiving signal S32 with the reference voltage Vref at the timings of the falling edges of the clock signal CL32. An output signal having the high-level is generated and outputted to a first input terminal of the NAND gate 58 when the signal voltage of the receiving signal S32 is equal to or larger than the reference voltage Vref. On the other hand, an output signal having the low-level is generated and outputted to the first input terminal of the NAND gate 58 when the signal voltage of the receiving signal S32 is smaller than the reference voltage Vref. The comparator 54 compares the signal voltage of the receiving signal S32 with the reference voltage −Vref at the timings of the falling edges of the clock signal CL32. An output signal having the high-level is generated and outputted to a second input terminal of the NAND gate 58 and a first input terminal of the AND gate 62 when the signal voltage of the receiving signal S32 is equal to or larger than the reference voltage −Vref. On the other hand, an output signal having the low-level is generated and outputted to the second input terminal of the NAND gate 58 and the first input terminal of the AND gate 62 when the signal voltage of the receiving signal S32 is smaller than the reference voltage −Vref.

Further, an output signal from the NAND gate 58 is outputted to a second input terminal of the AND gate 62. In addition, the output signal from the NAND gate 58 is outputted as a decoded signal S42 to the output terminal T32 via a contact "a" of the switch 65, and to the register 67 via the contact "a" of the switch 65 at the timings of the falling edges of the clock signal CL32. The register 67 temporarily stores the inputted decoded signal S42, and outputs the decoded signal S42 to a contact "b" side of the switch 64. In addition, an output signal from the AND gate 62 is outputted to a control terminal of the switch 65. In this case, the switch 65 is switched over to the contact "a" side in response to an output signal having the low-level from the AND gate 62 or switched over to the contact "b" side in response to an output signal having the high-level from the AND gate 62. An output signal from the register 68 is outputted as the decoded signal S42 to the output terminal T32 via the contact "b" of the switch 65, and to the register 67 via the contact "b" of the switch 65 at the timings of the falling edges of the clock signal CL32.

The adder 49 adds an output signal from the differential amplifier 46 to the combined transmission signal S22 from the input terminal T22, and outputs a resultant signal as a receiving signal S33 to a non-inverted input terminal of the comparator 55 and a non-inverted input terminal of the comparator 56. The comparator 55 compares a signal voltage of the receiving signal S33 with the reference voltage Vref at the timings of the falling edges of the clock signal CL33. An output signal having the high-level is generated and outputted to a first input terminal of the NAND gate 59 when the signal voltage of the receiving signal S33 is equal to or larger than the reference voltage Vref. On the other hand, an output signal having the low-level is generated and outputted to the first input terminal of the NAND gate 59 when the signal voltage of the receiving signal S33 is smaller than the reference voltage Vref. The comparator 56 compares the signal voltage of the receiving signal S33 with the reference voltage −Vref at the timings of the falling edges of the clock signal CL33. An output signal having the high-level is generated and outputted to a second input terminal of the NAND gate 59 and a first input terminal of the AND gate 63 when the signal voltage of the receiving signal S33 is equal to or larger than the reference voltage −Vref. On the other hand, an output signal having the low-level is generated and outputted to the second input terminal of the NAND gate 59 and the first input terminal of the AND gate 63 when the signal voltage of the receiving signal S33 is smaller than the reference voltage −Vref.

Further, an output signal from the NAND gate 59 is outputted to a second input terminal of the AND gate 63. In addition, the output signal from the NAND gate 59 is outputted as a decoded signal S43 to the output terminal T33 via a contact "a" of the switch 66, and to the register 68 via the contact "a" of the switch 66 at the timings of the falling edges of the clock signal CL33. The register 68 temporarily stores the inputted decoded signal S43, and outputs the decoded signal S43 to the contact "b" side of the switch 65. In addition, an output signal from the AND gate 63 is outputted to a control terminal of the switch 66. In this case, the switch 66 is switched over to the contact "a" side in response to an output signal having the low-level from the AND gate 63 or switched over to the contact "b" side in response to an output signal having the high-level from the AND gate 63. An output signal from the register 69 is outputted as the decoded signal S43 to the output terminal T33 via the contact "b" of the switch 66, and to the register 68 via the contact "b" of the switch 66 at the timings of the falling edges of the clock signal CL33.

As described above, the receiver circuit 201 is characterized by generating the three receiving signals S31 to S33, by combining each groups of three combined transmission signals S21 to S23 such that a first combined transmission signal is combined with an inverted signal of a second combined transmission signal and a third combined transmission signal, when each of the groups of the three combined transmission signals S21 to S23 includes the first, second and third combined transmission signals among the three combined transmission signals S21 to S23. In addition, the decoder circuit 202 is characterized by detecting signal levels of the receiving signals S31 to S33 at the timings that are different from each other and determined based on the clock signal CL3 having a cycle Δt3 being ⅓ of the cycle Δt1 of the clock signal CL, detecting decoded signals S41 to S43 of the transmission signals S1 to S3 based on the detected signal levels of the receiving signals S31 to S33, respectively, and outputting the decoded signals S41 to S43. In this case, the decoder circuit 202 has the registers 69, 67 and 68 for temporarily storing the decoded signals S41, S42 and S43, respectively, compares the receiving signals S31 to S33 with the reference voltage Vref, and compares the receiving signals S31 to S33 with the reference voltage −Vref. When each of the receiving signals S31 to S33 is equal to or larger than the reference voltage Vref, the decoder circuit 202 outputs a decoded signal having the high-level, and when each of the receiving signals S31 to S33 is smaller than the reference voltage −Vref, the decoder circuit 202 outputs a decoded signal having the low level. When each of the receiving signals S31 to S33 is smaller than the reference voltage Vref and equal to or larger than the reference voltage −Vref, the decoder means outputs a decoded signal, which is stored in the respective register 67 to 69 at a processing timing immediately prior to a current processing timing, and which is decoded from a receiving signal adjacent to a receiving signal to be processed in a predetermined direction.

With reference to FIGS. 3 to 8, operation of the signal transmitting system configured as described above is described on the case where transmission data D1 having a data value "00001111", transmission data D2 having a data value "00110011" and transmission data D3 having a data value "01010101" are transmitted.

Figure 3A:
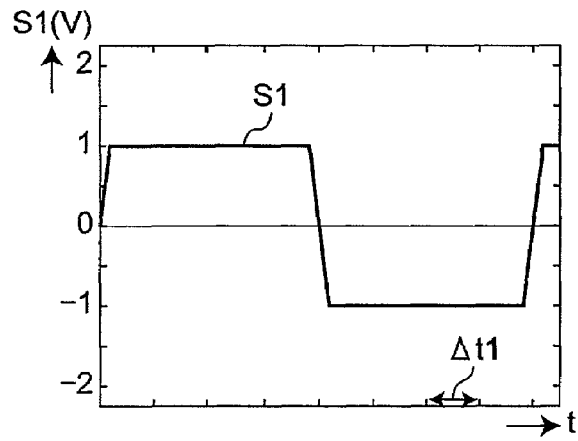
FIG. 3A is a waveform chart showing a signal voltage of a transmission signal S1 outputted from a signal generator 101 of FIG. 1 to an input terminal T1 of the signal transmitter apparatus 100 via a buffer 111.
Figure 3B:
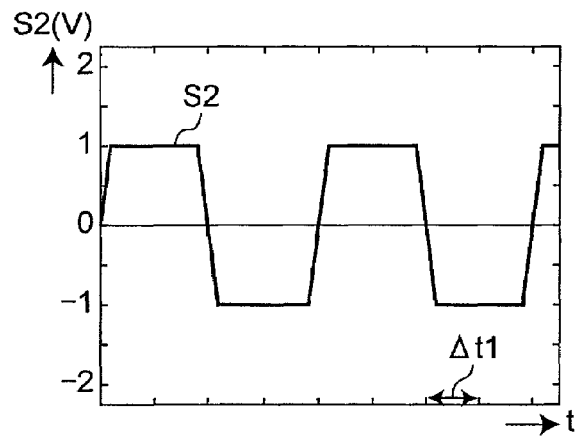
FIG. 3B is a waveform chart showing a signal voltage of a transmission signal S2 outputted from a signal generator 102 of FIG. 1 to an input terminal T2 of the signal transmitter apparatus 100 via a buffer 112.
Figure 3C:
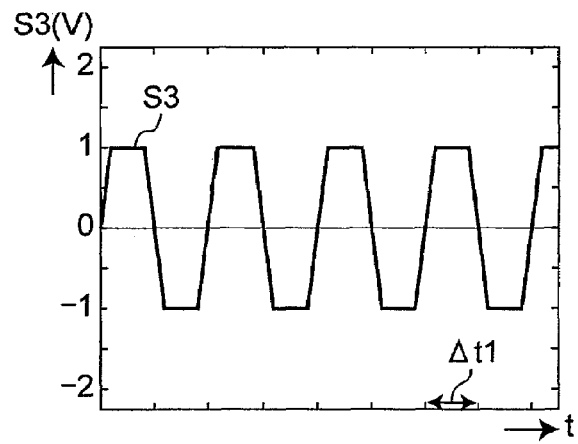
FIG. 3C is a waveform chart showing a signal voltage of a transmission signal S3 outputted from a signal generator 103 of FIG. 1 to an input terminal T3 of the signal transmitter apparatus 100 via a buffer 113.

FIG. 3A is a waveform chart showing a signal voltage of the transmission signal S1 outputted from the signal generator 101 of FIG. 1 to the input terminal T1 of the signal transmitter apparatus 100 via the buffer 111. FIG. 3B is a waveform chart showing a signal voltage of the transmission signal S2 outputted from the signal generator 102 of FIG. 1 to the input terminal T2 of the signal transmitter apparatus 100 via the buffer 112. FIG. 3C is a waveform chart showing a signal voltage of the transmission signal S3 outputted from the signal generator 103 of FIG. 1 to the input terminal T3 of the signal transmitter apparatus 100 via the buffer 113. As shown in FIG. 3A, the signal generator 101 generates the transmission signal S1 based on the transmission data D1 having the data value "00001111", and outputs the transmission signal S1 to the differential driver amplifier 21 via the buffer 111 and the input terminal T1. In addition, as shown in FIG. 3B, the signal generator 102 generates the transmission signal S2 based on the transmission data D2 having the data value "00110011", and outputs the transmission signal S2 to the phase shifter 12 via the buffer 112. Further, as shown in FIG. 3C, the signal generator 103 generates the transmission signal S3 based on the transmission data D3 having the data value "01010101", and outputs the transmission signal S3 to the phase shifter 13 via the buffer 113 and the input terminal T3.

Figure 4A:
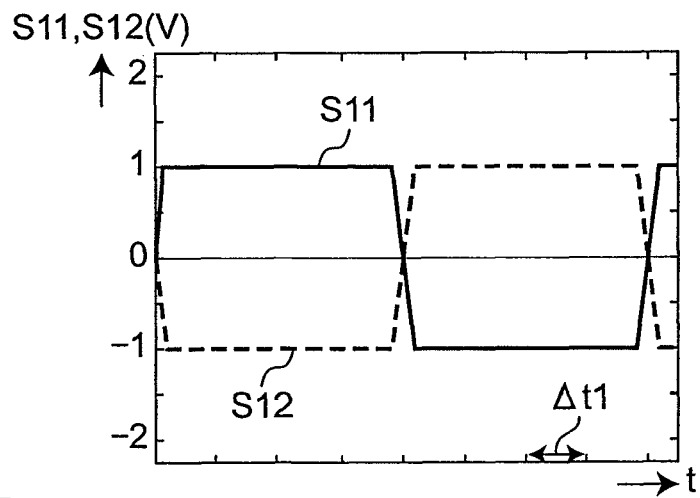
FIG. 4A is a waveform chart showing a signal voltage of a non-inverted signal S11 from a non-inverted output terminal of a differential driver amplifier 21 of FIG. 1 and a waveform chart showing a signal voltage of an inverted signal S12 from an inverted output terminal of the differential driver amplifier 21.
Figure 4B:
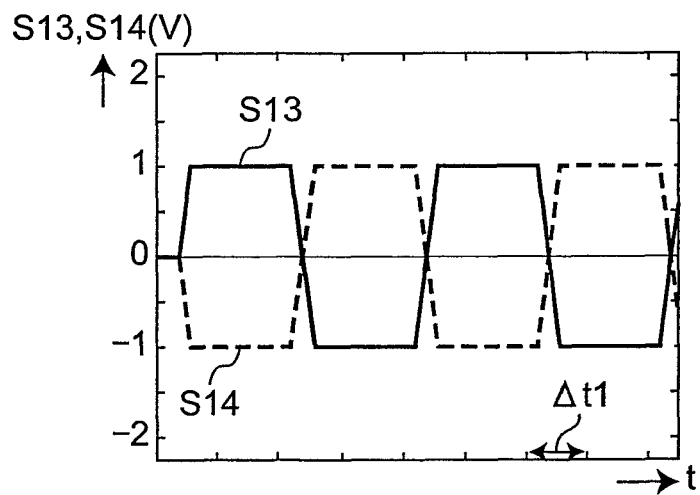
FIG. 4B is a waveform chart showing a signal voltage of a non-inverted signal S13 from a non-inverted output terminal of a differential driver amplifier 22 of FIG. 1 and a waveform chart showing a signal voltage of an inverted signal S14 from an inverted output terminal of the differential driver amplifier 22.
Figure 4C:
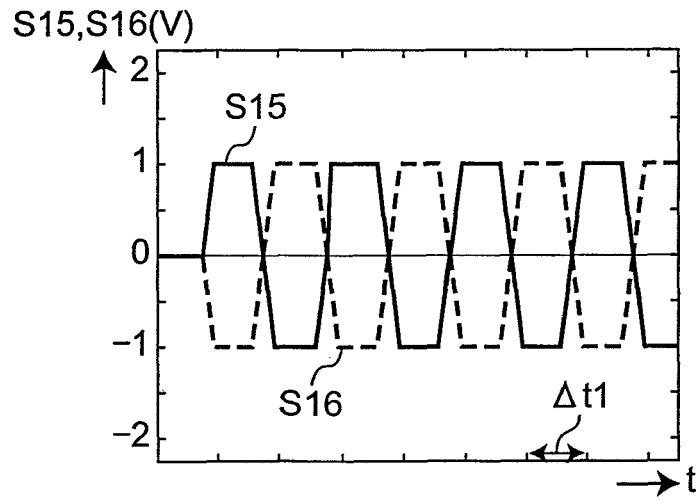
FIG. 4C is a waveform chart showing a signal voltage of a non-inverted signal S15 from a non-inverted output terminal of a differential driver amplifier 23 of FIG. 1 and a waveform chart showing a signal voltage of an inverted signal S16 from an inverted output terminal of the differential driver amplifier 23.
Figure 5A:
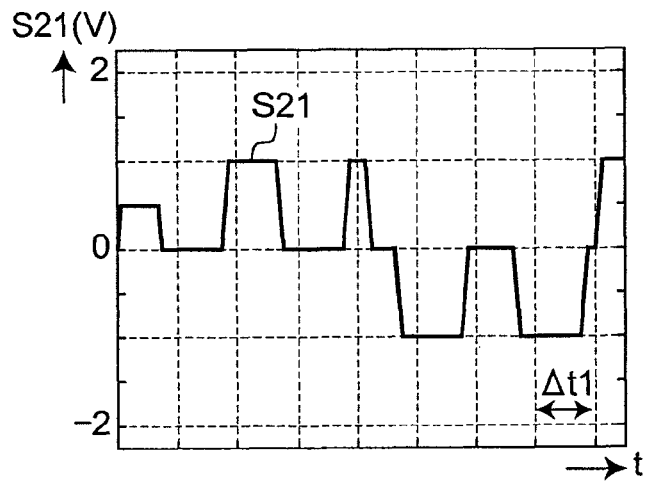
FIG. 5A is a waveform chart showing a signal voltage at an input terminal T21 of a combined transmission signal S21 outputted to a transmission conductor 31 via an output terminal T11 of the signal transmitter apparatus 100 of FIG. 1.
Figure 5B:
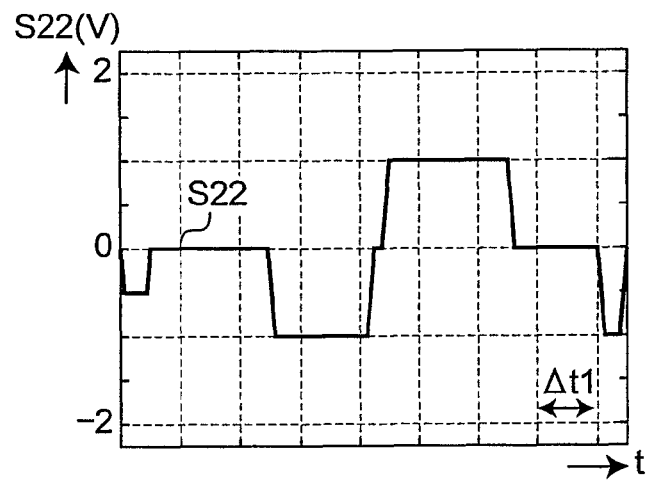
FIG. 5B is a waveform chart showing a signal voltage at an input terminal T22 of a signal S22 outputted to a transmission conductor 32 via an output terminal T12 of the signal transmitter apparatus 100 of FIG. 1.
Figure 5C:
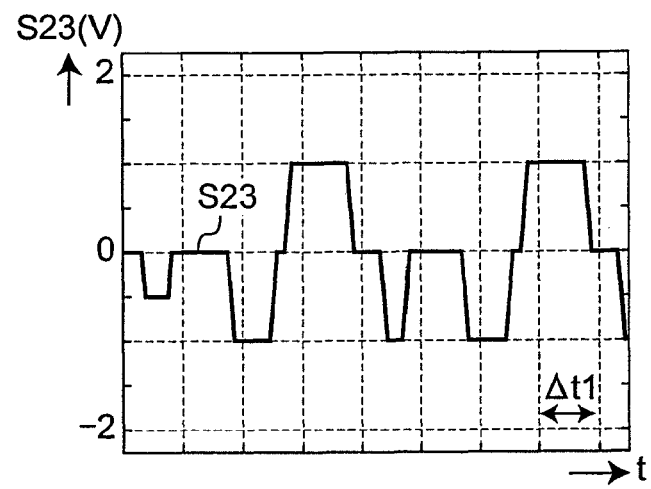
FIG. 5C is a waveform chart showing a signal voltage at an input terminal T23 of a combined transmission signal S23 outputted to a transmission conductor 33 via an output terminal T13 of the signal transmitter apparatus 100 of FIG. 1.

In addition, FIG. 4A is a waveform chart showing a signal voltage of the non-inverted signal S11 from the non-inverted output terminal of the differential driver amplifier 21 of FIG. 1 and a signal voltage of the inverted signal S12 from the inverted output terminal of the differential driver amplifier 21. FIG. 4B is a waveform chart showing a signal voltage of the non-inverted signal S13 from the non-inverted output terminal of the differential driver amplifier 22 of FIG. 1 and a signal voltage of the inverted signal S14 from the inverted output terminal of the differential driver amplifier 22. FIG. 4C is a waveform chart showing a signal voltage of the non-inverted signal S15 from the non-inverted output terminal of the differential driver amplifier 23 of FIG. 1 and a signal voltage of the inverted signal S16 from the inverted output terminal of the differential driver amplifier 23. Further, FIG. 5A is a waveform chart showing a signal voltage at the input terminal T21 of the combined transmission signal S21 outputted to the transmission conductor 31 via the output terminal T1 of the signal transmitter apparatus 100 of FIG. 1. FIG. 5B is a waveform chart showing a signal voltage at the input terminal T22 of the combined transmission signal S22 outputted to the transmission conductor 32 via the output terminal T12 of the signal transmitter apparatus 100 of FIG. 1. FIG. 5C is a waveform chart showing a signal voltage at the input terminal T23 of the combined transmission signal S23 outputted to the transmission conductor 33 via the output terminal T13 of the signal transmitter apparatus 100 of FIG. 1.

As shown in FIGS. 3 to 5, the non-inverted signal S11 of the transmission signal S1 is combined with the inverted signal S16 of the transmission signal S3 whose phase is shifted by 240 degrees by the phase shifter 13, and the resultant combined transmission signal S21 is transmitted to the signal receiver apparatus 200 via the output terminal T11, the transmission conductor 31 and the input terminal T21. In addition, the non-inverted signal S13 of the transmission signal S2 whose phase is shifted by 120 degrees by the phase shifter 12 is combined with the inverted signal S12 of the transmission signal S1, and the resultant combined transmission signal S22 is transmitted to the signal receiver apparatus 200 via the output terminal T12, the transmission conductor 32 and the input terminal T22. Further, the non-inverted signal S11 of the transmission signal S3 whose phase is shifted by 240 degrees by the phase shifter 13 is combined with the inverted signal S14 of the transmission signal S2 whose phase is shifted by 120 degrees by the phase shifter 12, and the resultant combined transmission signal S23 is transmitted to the signal receiver apparatus 200 via the output terminal T13, the transmission conductor 33 and the input terminal T23. It is noted that, in FIGS. 5A, 5B and 5C, the signal voltages at the input terminals T21 to T23 of the combined transmission signals S31 to S33 have values half of the signal voltages at the output terminals T11 to T13, respectively, due to losses at the transmission conductors 31 to 33.

Figure 6A:
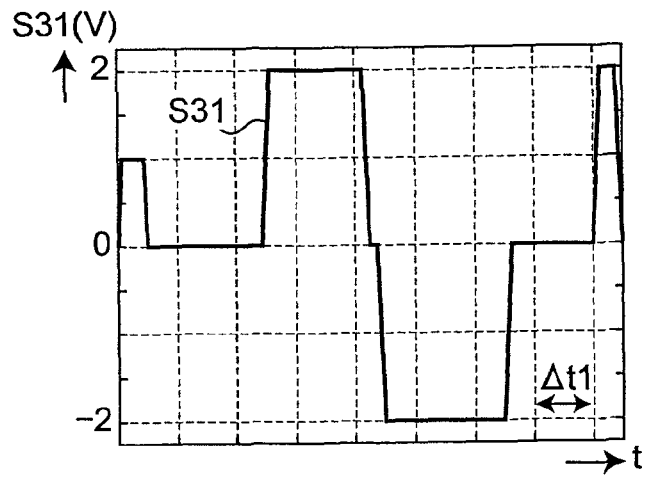
FIG. 6A is a waveform chart showing a signal voltage of a receiving signal S31 from an adder 47 of FIG. 2.
Figure 6B:
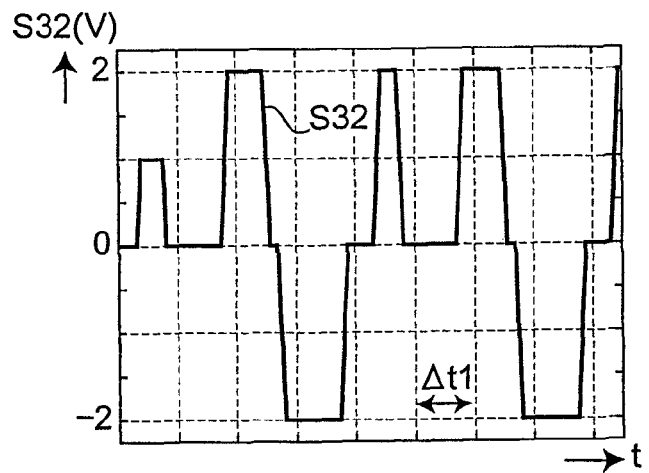
FIG. 6B is a waveform chart showing a signal voltage of a receiving signal S32 from an adder 48 of FIG. 2.
Figure 6C:
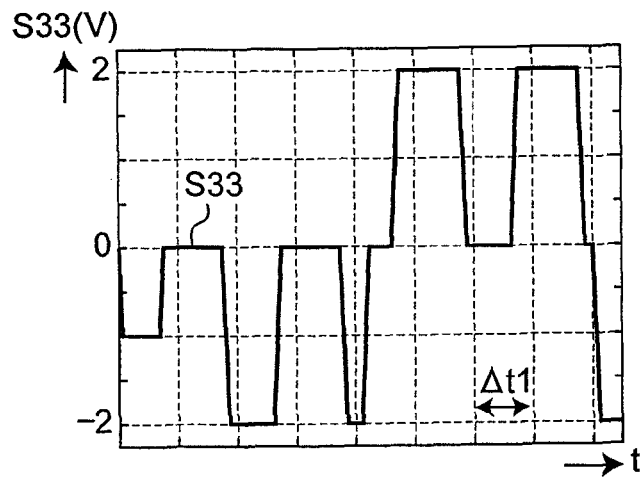
FIG. 6C is a waveform chart showing a signal voltage of a receiving signal S33 from an adder 49 of FIG. 2.

FIG. 6A is a waveform chart showing a signal voltage of the receiving signal S31 from the adder 47 of FIG. 2. FIG. 6B is a waveform chart showing a signal voltage of the receiving signal S32 from the adder 48 of FIG. 2. FIG. 6C is a waveform chart showing a signal voltage of the receiving signal S33 from the adder 49 of FIG. 2. As shown in FIG. 6, the adder 47 adds a signal obtained by subtracting the combined transmission signal S22 from the combined transmission signal S21 to the combined transmission signal S23, and outputs a resultant signal as the receiving signal S31 to the non-inverted input terminal of the comparator 51 and the non-inverted input terminal of the comparator 52. The adder 48 adds a signal obtained by subtracting the combined transmission signal S23 from the combined transmission signal S22 to the combined transmission signal S21, and outputs a resultant signal as the receiving signal S32 to the non-inverted input terminal of the comparator 53 and the non-inverted input terminal of the comparator 54. Further, the adder 49 adds a signal obtained by subtracting the combined transmission signal S21 from the combined transmission signal S23 to the combined transmission signal S22, and outputs a resultant signal as the receiving signal S33 to the non-inverted input terminal of the comparator 55 and the non-inverted input terminal of the comparator 56.

Figure 7:
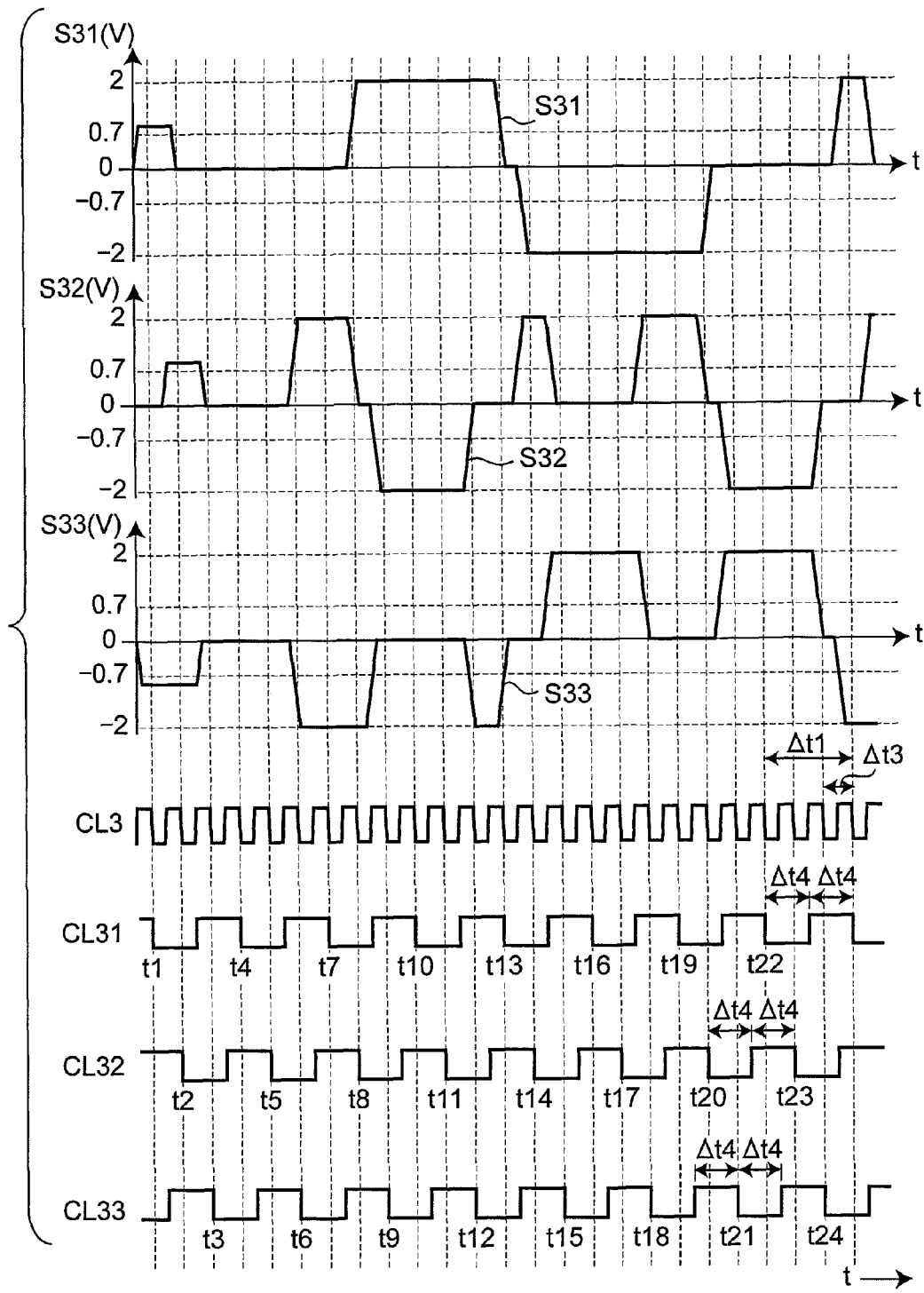
FIG. 7 is a timing chart showing one example of the operation of the signal receiver apparatus 200 of FIG. 2.

FIG. 7 is a timing chart showing one example of the operation of the signal receiver apparatus 200 of FIG. 2. FIG. 8 is one exemplified table showing the transmission data D1, D2 and D3 transmitted by the transmission signal S1 of FIG. 3A, the transmission signal S2 of FIG. 3B and the transmission signal S3 of FIG. 3C, respectively, signal voltages detected at predetermined timings from the receiving signal S31 of FIG. 6A, the receiving signal S32 of FIG. 6B and the receiving signal S33 of FIG. 6C, respectively, the signal voltage level of the decoded signal S41 outputted from the output terminal T31 of the signal receiver apparatus 200 of FIG. 2, the signal voltage level of the decoded signal S42 outputted from the output terminal T32 of the signal receiver apparatus 200 of FIG. 2, and the signal voltage level of the decoded signal S43 outputted from the output terminal T33 of the signal receiver apparatus 200 of FIG. 2. In this case, the reference voltage Vref generated by each of the reference voltage sources 51a, 53a and 55a is set to 0.7 V, and the reference voltage −Vref generated by each of the reference voltage sources 52a, 54a and 56a is set to −0.7 V.

Referring to FIG. 7, at the timing t1, the comparator 51 compares the signal voltage (1 V) of the receiving signal S31 with the reference voltage Vref, generates an output signal having the high-level, and outputs the output signal to the first input terminal of the NAND gate 57. In addition, at the timing t1, the comparator 52 compares the signal voltage of the receiving signal S31 with the reference voltage −Vref, generates an output signal having the high-level, and outputs the output signal to the second input terminal of the NAND gate 57 and the first input terminal of the AND gate 61. Further, an output signal having the low-level from the NAND gate 57 is outputted to the second input terminal of the AND gate 61. Subsequently, in response to an output signal having the low-level from the AND gate 61, the switch 64 is switched over to the contact "a" side, and an output signal having the low-level from the NAND gate 57 is outputted as the decoded signal S41 having the low-level to the output terminal T31 via the contact "a" of the switch 64 and to the register 69 at the timing t1.

At the timing t2, the comparator 53 compares the signal voltage (1 V) of the receiving signal S32 with the reference voltage Vref, generates an output signal having the high-level, and outputs the output signal to the first input terminal of the NAND gate 58. In addition, at the timing t2, the comparator 54 compares the signal voltage of the receiving signal S32 with the reference voltage −Vref, generates an output signal having the high-level, and outputs the output signal to the second input terminal of the NAND gate 58 and the first input terminal of the AND gate 62. Further, an output signal having the low-level from the NAND gate 58 is outputted to the second input terminal of the AND gate 62. Subsequently, in response to an output signal having the low-level from the AND gate 62, the switch 65 is switched over to the contact "a" side, and an output signal having the low-level from the NAND gate 58 is outputted as the decoded signal S42 having the low-level to the output terminal T32 via the contact "a" of the switch 65 and to the register 67 at the timing t2.

At the timing t3, the comparator 55 compares the signal voltage (0 V) of the receiving signal S33 with the reference voltage Vref, generates an output signal having the low-level, and outputs the output signal to the first input terminal of the NAND gate 59. In addition, at the timing t3, the comparator 56 compares the signal voltage of the receiving signal S33 with the reference voltage −Vref, generates an output signal having the high-level and outputs the output signal to the second input terminal of the NAND gate 59 and the first input terminal of the AND gate 63. Further, an output signal having the high-level from the NAND gate 59 is outputted to the second input terminal of the AND gate 63. Subsequently, in response to an output signal having the high-level from the AND gate 63, the switch 66 is switched over to the contact "b" side, and the low-level signal stored in the register 69 at the timing t1 is outputted as the decoded signal S43 having the low-level to the output terminal T33 via the contact "b" of the switch 65 and to the register 68 at the timing t3.

At the timing t4, the comparator 51 compares the signal voltage (0 V) of the receiving signal S31 with the reference voltage Vref, generates an output signal having the low-level, and outputs the output signal to the first input terminal of the NAND gate 57. In addition, at the timing t4, the comparator 52 compares the signal voltage of the receiving signal S31 with the reference voltage −Vref, generates an output signal having the high-level, and outputs the output signal to the second input terminal of the NAND gate 57 and the first input terminal of the AND gate 61. Further, an output signal having the high-level from the NAND gate 57 is outputted to the second input terminal of the AND gate 61. Subsequently, in response to an output signal having the high-level from the AND gate 61, the switch 64 is switched over to the contact "b" side, and the low-level signal stored in the register 67 at the timing t2 is outputted as the decoded signal S41 having the low-level to the output terminal T31 via the contact "b" of the switch 64 and to the register 69 at the timing t4.

At the timing t5, the comparator 53 compares the signal voltage (0 V) of the receiving signal S32 with the reference voltage Vref, generates an output signal having the low-level, and outputs the output signal to the first input terminal of the NAND gate 58. In addition, at the timing t5, the comparator 54 compares the signal voltage of the receiving signal S32 with the reference voltage −Vref, generates an output signal having the high-level, and outputs the output signal to the second input terminal of the NAND gate 58 and the first input terminal of the AND gate 62. Further, an output signal having the high-level from the NAND gate 58 is outputted to the second input terminal of the AND gate 62. Subsequently, in response to an output signal having the high-level from the AND gate 62, the switch 65 is switched over to the contact "b" side, and the low-level signal stored in the register 68 at the timing t3 is outputted as the decoded signal S42 having the low-level to the output terminal T32 via the contact "b" of the switch 65 and to the register 67 at the timing t5.

At the timing t6, the comparator 55 compares the signal voltage (−2 V) of the receiving signal S33 with the reference voltage Vref, generates an output signal having the low-level, and outputs the signal to the first input terminal of the NAND gate 59. In addition, at the timing t6, the comparator 56 compares the signal voltage of the receiving signal S33 with the reference voltage −Vref, generates an output signal having the low-level, and outputs the output signal to the second input terminal of the NAND gate 59 and the first input terminal of the AND gate 63. Further, an output signal having the high-level from the NAND gate 59 is outputted to the second input terminal of the AND gate 63. Subsequently, in response to an output signal having the low-level from the AND gate 63, the switch 66 is switched over to the contact "a" side, and an output signal having the high-level from the NAND gate 59 is outputted as the decoded signal S43 having the high-level to the output terminal T33 via the contact "a" of switch 66 and to the register 68 at the timing t6.

Subsequently, in a manner similar to that of the timing t1, the decoded signals S41 to S43 each having the low-level or high-level are generated based on the signal voltages of the receiving signal S31 at the timings t7, t10, t13, t16, t19 and t22, the signal voltages of the receiving signal S32 at the timings t8, t11, t14, t17, t20 and t23, and the signal voltages of the receiving signal S33 at the timings t9, t12, t15, t18, t21 and t24.

As described in detail above, according to the signal transmitter apparatus of the present preferred embodiment, the three combined transmission signals S21 to S23 are generated based on the three transmission signals S1 to S3, and outputted as coded output signals to the three transmission conductors 31 to 33, respectively. In addition, according to the signal receiver apparatus of the present preferred embodiment, the receiving signals S31 to S33 are generated based on the combined transmission signals S21 to S23 received via the three transmission conductors 31 to 33, and the decoded signals S41 to S43 of the three transmission signals S1 to S3 are detected based on the receiving signals S31 to S33. Further, according to the signal transmitting system of the present preferred embodiment, the signal transmitting system have the signal transmitter apparatus 100, the signal receiver apparatus 200 and the transmission line 30 connecting the signal transmitter apparatus 100 with the signal receiver apparatus 200. Therefore, according to the signal transmitter apparatus and method, the signal receiver apparatus and method, and the signal transmitting system of the present invention, three transmission signals can be transmitted by using three transmission conductors. Conventionally, when three transmission signals are transmitted, a total of five transmission conductors are required since two transmission signals are transmitted via three transmission conductors by using the data transmission system of the prior art, and the remaining one transmission signal has been transmitted via two transmission conductors by using the conventional differential transmission system. Namely, according to the present invention, the number of the transmission conductors can be reduced as compared with the prior art.

In the above-described preferred embodiment, the clock signal CL generated by the clock signal generator 151 is transmitted to the signal receiver apparatus 200 via the clock signal line 34. However, the present invention is not limited to this, and the clock signal CL may be regenerated based on the signals 31 to 33 transmitted via the transmission line 30 and outputted to the frequency multiplier 81.

In addition, in the above-described preferred embodiment, the phase shifter circuit 10 has the phase shifters 12 and 13. However, the present invention is not limited to this, and such a phase shifter circuit may be provided that shifts the phases of the transmission signals S1 to S3 by predetermined phase shift amounts, respectively, so that the phase shift amounts of the transmission signals S1 to S3 are different from each other by $2\pi/3$, to output three phase-shifted signals which are phase-shifted from the three transmission signals S1 to S3, to the differential driver amplifiers 21 to 23.

Further, in the above preferred embodiment, the combined transmission signal S21 is generated by combining the non-inverted signal S11 from the differential driver amplifier 21 with the inverted signal S16 from the differential driver amplifier 23, the combined transmission signal S22 is generated by combining the non-inverted signal S13 from the differential driver amplifier 22 with the inverted signal S12 from the differential driver amplifier 21, and the combined transmission signal S23 is generated by combining the non-inverted signal S15 from the differential driver amplifier 23 with the inverted signal S14 from the differential driver amplifier 22. However, the present invention is not limited to this. The combined transmission signal S21 may be generated by combining the non-inverted signal S11 from the differential driver amplifier 21 with the inverted signal S14 from the differential driver amplifier 22, the combined transmission signal S22 may be generated by combining the non-inverted signal S13 from the differential driver amplifier 22 with the inverted signal S16 from the differential driver amplifier 23, and the combined transmission signal S23 may be generated by combining the non-inverted signal S15 from the differential driver amplifier 23 with the inverted signal S12 from the differential driver amplifier 21. In this case, in the receiver circuit 201 of the signal receiver apparatus 200, it is required to output the combined transmission signal S21 to the non-inverted input terminal of the differential amplifier 44, the inverted input terminal of the differential amplifier 45 and the adder 49, to output the combined transmission signal S22 to the non-inverted input terminal of the differential amplifier 45, the inverted input terminal of the differential amplifier 46 and the adder 47, and to output the combined transmission signal S23 to the non-inverted input terminal of the differential amplifier 46, the inverted input terminal of the differential amplifier 44 and the adder 48. Further, in the decoder circuit 202 of the signal receiver apparatus 200, it is required to connect the output terminal of the register 67 to the contact "b" of the switch 66, to connect the output terminal of the register 68 to the contact "b" of the switch 64 and to connect the output terminal of the register 69 to the contact "b" of the switch 65.

Still further, in the above preferred embodiment, the receiving signal S31 is generated by adding the output signal from the differential amplifier 44 to the combined transmission signal S23, the receiving signal S32 is generated by adding the output signal from the differential amplifier 45 to the combined transmission signal S21, and the receiving signal S33 is generated by adding the output signal from the differential amplifier 46 to the combined transmission signal S22. However, the present invention is not limited to this. In this case, the receiving signal S31 may generated by combining the combined transmission signal S21 with the inverted signal of the combined transmission signal S22 and the combined transmission signal S23, the receiving signal S32 may be generated by combining the combined transmission signal S22 with the inverted signal of the combined transmission signal S23 and the combined transmission signal S21, and the receiving signal S33 may be generated by combining the combined transmission signal S23 with the inverted signal of the combined transmission signal S21 and the combined transmission signal S22.

In addition, in the above-described preferred embodiment, the three transmission signals S1 to S3 are transmitted via the transmission line including the three transmission conductors 31 to 33. However, the present invention is not limited to this, N transmission signals may be transmitted via a transmission line including N transmission conductors, where N is equal to or larger than three. In this case, the signal transmitter apparatus should preferably have (a) phase shifter means for shifting phases of the transmission signals by predetermined phase shift amounts, respectively, so that the phase shift amounts of the transmission signals are different from each other by $2\pi/N$, to output N phase-shifted signals which are phase-shifted from the N transmission signals, (b) a plurality of N inverter means for generating inverted signals of the first to Nth phase-shifted signals, and outputting the inverted signals, and (c) a plurality of N coding transmitter means for generating N combined transmission signals and outputting the N combined transmission signals to the transmission conductors, respectively, by combining each of pairs of the phase-shifted signals such that an inverted signal of a first phase-shifted signal is combined with a second phase-shifted signal, when each of the pairs of the phase-shifted signals includes the first and second phase-shifted signals among the N phase-shifted signals and phase shift amounts of the first and second phase-shifted signals are different from each other by $2\pi/N$.

Further, the signal receiver apparatus should preferably have (a) receiver means for generating N receiving signals, by combining each groups of three combined transmission signals such that a first combined transmission signal is combined with an inverted signal of a second combined transmission signal and a third combined transmission signal, when each of the groups of the three combined transmission signals includes the first, second and third combined transmission signals among the N combined transmission signals, and (b) decoder means for detecting signal levels of the receiving signals at timings that are different from each other and determined based on a second clock signal having a cycle being 1/N of the predetermined cycle, detecting decoded signals of the transmission signals based on the detected signal levels of the receiving signals, respectively, and outputting the decoded signals.

In this case, the decoder means preferably comprises register means for temporarily storing the decoded signals of the transmission signals. The decoder means compares each of the receiving signals with a first signal level, and compares each of the receiving signals with a second signal level smaller than the first signal level. When each of the receiving signals is equal to or larger than the first signal level, the decoder means outputs a decoded signal having a first signal level, when each of the receiving signals is smaller than the second signal level, the decoder means outputs a decoded signal having a second signal level, and when each of the receiving signals is smaller than the first signal level and equal to or larger than the second signal level, the decoder means outputs a decoded signal, which is stored in the register means at a processing timing immediately prior to a current processing timing, and which is decoded from a receiving signal adjacent to a receiving signal to be processed in a predetermined direction.

In addition, in the above-mentioned preferred embodiment, the signal receiver apparatus 200 detects the decoded signals S41 to S43 of the transmission signals S1 to S3 based on the signal voltages of the receiving signals S31 to S33 in the above preferred embodiment. However, the present invention is not limited to this, and the decoded signals S41 to S43 of the transmission signals S1 to S3 may be detected based on the signal levels of the receiving signals S31 to S33.

Further, in the above-described preferred embodiment, t the decoder circuit 202 is constructed by including the comparators 51 to 56, the reference voltage sources 51a to 56a, the NAND gates 57 to 59, the AND gates 61 to 63, the switches 64 to 66 and the registers 67 to 69. However, the present invention is not limited to this, and another circuit configuration for carrying out logical operation similar to that of the decoder circuit 202.

INDUSTRIAL APPLICABILITY

As described in detail above, according to the signal transmitter apparatus or the signal transmitting method of the present invention, a plurality of N transmission signals generated in synchronization with a first clock signal having a predetermined cycle are coded into a plurality of N combined transmission signals, and thereafter, the plurality of N combined transmission signals are transmitted via a transmission line including a plurality of N transmission conductors. In this case, N is equal to or larger than three. In addition, according to the signal receiver apparatus or the signal receiving method of the present invention, the plurality of N combined transmission signals are received via the transmission line including the plurality of N transmission conductors, and decoded signals of the plurality of N transmission signals are detected based on the received combined transmission signals. Further, according to the signal transmitting system of the present invention, the signal transmitting system have the signal transmitter apparatus, the signal receiver apparatus, and the transmission line including the plurality of N transmission conductors for connecting the signal transmitter apparatus with the signal receiver apparatus.

Therefore, according to the signal transmitter apparatus and method, the signal receiver apparatus and method and the signal transmitting system of the present invention, N transmission signals can be transmitted by using N transmission conductors. For example, although the four transmission signals have been transmitted by using five transmission conductors in the data transmission system of the prior art, the four transmission signals can be transmitted by using four transmission conductors according to the present invention. It is possible to reduce the number of the transmission conductors as compared with the data transmission system of the prior art.

The invention claimed is:

1. A signal transmitter apparatus for transmitting a plurality of N transmission signals generated in synchronization with a first clock signal having a predetermined cycle, via a transmission line including a plurality of N transmission conductors, N being equal to or larger than three, the signal transmitter apparatus comprising:
   a phase shifter for shifting phases of the transmission signals by predetermined phase shift amounts, respectively, so that the phase shift amounts of the transmission signals are different from each other by $2\pi/N$, to output N phase-shifted signals which are phase-shifted from the N transmission signals;
   a plurality of N inverters for generating inverted signals of the first to Nth phase-shifted signals, and outputting the inverted signals; and
   a plurality of N coding transmitters for generating N combined transmission signals and outputting the N combined transmission signals to the transmission conductors, respectively, by combining each of pairs of the phase-shifted signals such that an inverted signal of a first phase-shifted signal is combined with a second phase-shifted signal, when each of the pairs of the phase-shifted signals includes the first and second phase-shifted signals among the N phase-shifted signals and phase shift amounts of the first and second phase-shifted signals are different from each other by $2\pi/N$.

2. A signal receiver apparatus for receiving a plurality of N combined transmission signals transmitted by a signal transmitter apparatus for transmitting a plurality of N transmission signals generated in synchronization with a first clock signal having a predetermined cycle, via a transmission line including a plurality of N transmission conductors, N being equal to or larger than three,
   wherein the signal transmitter apparatus comprises:
   a phase shifter for shifting phases of the transmission signals by predetermined phase shift amounts, respectively, so that the phase shift amounts of the transmission signals are different from each other by $2\pi/N$, to output N phase-shifted signals which are phase-shifted from the N transmission signals;
   a plurality of N inverters for generating inverted signals of the first to Nth phase-shifted signals, and outputting the inverted signals; and a plurality of N coding transmitters for generating the N combined transmission signals and outputting the N combined transmission signals to the signal receiver apparatus via the transmission conductors, respectively, by combining each of pairs of the phase-shifted signals such that an inverted signal of a first phase-shifted signal is combined with a second phase-shifted signal, when each of the pairs of the phase-shifted signals includes the first and second phase-shifted signals among the N phase-shifted signals and phase shift amounts of the first and second phase-shifted signals are different from each other by $2\pi/N$, and wherein the signal receiver apparatus comprises:

a receiver for receiving the N combined transmission signals, and generating N receiving signals, by combining each group of three combined transmission signals such that a first combined transmission signal is combined with an inverted signal of a second combined transmission signal and a third combined transmission signal, when each of the groups of the three combined transmission signals includes the first, second and third combined transmission signals among the N combined transmission signals; and a decoder for detecting signal levels of the receiving signals at timings that are different from each other and determined based on a second clock signal having a cycle being 1/N of the predetermined cycle, detecting decoded signals of the transmission signals based on the detected signal levels of the receiving signals, respectively, and outputting the decoded signals.

3. The signal receiver apparatus as claimed in claim 2, wherein the decoder comprises registers for temporarily storing the decoded signals of the transmission signals, wherein the decoder compares each of the receiving signals with a first signal level, and compares each of the receiving signals with a second signal level smaller than the first signal level, wherein, when each of the receiving signals is equal to or larger than the first signal level, the decoder outputs a decoded signal having a first signal level, when each of the receiving signals is smaller than the second signal level, the decoder outputs a decoded signal having a second signal level, and when each of the receiving signals is smaller than the first signal level and equal to or larger than the second signal level, the decoder outputs a decoded signal, which is stored in the registers at a processing timing immediately prior to a current processing timing, and which is decoded from a receiving signal adjacent to a receiving signal to be processed in a predetermined direction.

4. A signal transmitting system comprising:

a signal transmitter apparatus for transmitting a plurality of N transmission signals generated in synchronization with a first clock signal having a predetermined cycle, a signal receiver apparatus, and a transmission line including a plurality of N transmission conductors for connecting the signal transmitter apparatus with the signal receiver apparatus, N being equal to or larger than three, wherein the signal transmitter apparatus comprises:

a phase shifter for shifting phases of the transmission signals by predetermined phase shift amounts, respectively, so that the phase shift amounts of the transmission signals are different from each other by $2\pi/N$, to output N phase-shifted signals which are phase-shifted from the N transmission signals;

a plurality of N inverters for generating inverted signals of the first to Nth phase-shifted signals, and outputting the inverted signals; and a plurality of N coding transmitters for generating the N combined transmission signals and outputting the N combined transmission signals to the signal receiver apparatus via the transmission conductors, respectively, by combining each of pairs of the phase-shifted signals such that an inverted signal of a first phase-shifted signal is combined with a second phase-shifted signal, when each of the pairs of the phase-shifted signals includes the first and second phase-shifted signals among the N phase-shifted signals and phase shift amounts of the first and second phase-shifted signals are different from each other by $2\pi/N$, and wherein the signal receiver apparatus comprises:

a receiver for receiving the N combined transmission signals, and generating N receiving signals, by combining each group of three combined transmission signals such that a first combined transmission signal is combined with an inverted signal of a second combined transmission signal and a third combined transmission signal, when each of the groups of the three combined transmission signals includes the first, second and third combined transmission signals among the N combined transmission signals; and a decoder for detecting signal levels of the receiving signals at timings that are different from each other and determined based on a second clock signal having a cycle being 1/N of the predetermined cycle, detecting decoded signals of the transmission signals based on the detected signal levels of the receiving signals, respectively, and outputting the decoded signals.

5. A signal transmitting method of transmitting a plurality of N transmission signals generated in synchronization with a first clock signal having a predetermined cycle, via a transmission line including a plurality of N transmission conductors, N being equal to or larger than three, the signal transmitting method including:

a step of shifting phases of the transmission signals by predetermined phase shift amounts, respectively, so that the phase shift amounts of the transmission signals are different from each other by $2\pi/N$, to output N phase-shifted signals which are phase-shifted from the N transmission signals;

a step of generating inverted signals of the first to Nth phase-shifted signals, and outputting the inverted signals; and a step of generating N combined transmission signals and outputting the N combined transmission signals to the transmission conductors, respectively, by combining each of pairs of the phase-shifted signals such that an inverted signal of a first phase-shifted signal is combined with a second phase-shifted signal, when each of the pairs of the phase-shifted signals includes the first and second phase-shifted signals among the N phase-shifted signals and phase shift amounts of the first and second phase-shifted signals are different from each other by $2\pi/N$.

6. A signal receiving method of receiving a plurality of N combined transmission signals transmitted by using a signal transmitting method of transmitting a plurality of N transmission signals generated in synchronization with a first clock signal having a predetermined cycle, via a transmission line including a plurality of N transmission conductors, N being equal to or larger than three, wherein the signal transmitting method includes:

a step of shifting phases of the transmission signals by predetermined phase shift amounts, respectively, so that the phase shift amounts of the transmission signals are different from each other by $2\pi/N$, to output N phase-shifted signals which are phase-shifted from the N transmission signals;

a step of generating inverted signals of the first to Nth phase-shifted signals, and outputting the inverted signals; and a step of generating N combined transmission signals and outputting the N combined transmission signals to the transmission conductors, respectively, by combining each of pairs of the phase-shifted signals such that an inverted signal of a first phase-shifted signal is combined with a second phase-shifted signal, when each of the pairs of the phase-shifted signals includes the first and second phase-shifted signals among the N phase-shifted signals and phase shift amounts of the first and second phase-shifted signals are different from each other by $2\pi/N$, and wherein the signal receiving method includes:

a step of generating N receiving signals, by receiving the N combined transmission signals, and combining each group of three combined transmission signals such that a first combined transmission signal is combined with an inverted signal of a second combined transmission signal and a third combined transmission signal, when each of the groups of the three combined transmission signals includes the first, second and third combined transmission signals among the N combined transmission signals; and a decoding step of detecting signal levels of the receiving signals at timings that are different from each other and determined based on a second clock signal having a cycle being 1/N of the predetermined cycle, detecting decoded signals of the transmission signals based on the detected signal levels of the receiving signals, respectively, and outputting the decoded signals.

7. The signal receiving method as claimed in claim 6, wherein the decoding step includes a step of temporarily storing the decoded signals of the transmission signals, wherein the decoding step further includes a step of comparing each of the receiving signals with a first signal level, and comparing each of the receiving signals with a second signal level smaller than the first signal level, wherein, the decoding step further includes the steps of, outputting a decoded signal having a first signal level when each of the receiving signals is equal to or larger than the first signal level, outputting a decoded signal having a second signal level when each of the receiving signals is smaller than the second signal level, and outputting a decoded signal, which is stored at a processing timing immediately prior to a current processing timing, and which is decoded from a receiving signal adjacent to a receiving signal to be processed in a predetermined direction, when each of the receiving signals is smaller than the first signal level and equal to or larger than the second signal level.

\* \* \* \* \*